United States Patent [19]

Johnston et al.

[11] 4,250,368

[45] Feb. 10, 1981

[54] DETACHABLE SWITCH STRUCTURE

[75] Inventors: Robert J. Johnston, Patterson Heights; Stephen G. Layciak, Brighton Township, Beaver County; Stephen S. Dobrosielski, Beaver, all of Pa.

[73] Assignee: Westinghouse Electric Corp., Pittsburgh, Pa.

[21] Appl. No.: 45,448

[22] Filed: Jun. 4, 1979

[51] Int. Cl.³ .............................................. H01H 13/00
[52] U.S. Cl. ...................................... 200/307; 200/296
[58] Field of Search ............... 200/307, 159 R, 159 A, 200/160, 293, 296, 340

[56] References Cited

U.S. PATENT DOCUMENTS

| 4,029,924 | 6/1977 | Frank et al. | 200/307 |
| 4,064,381 | 12/1977 | Mullen et al. | 200/16 A |
| 4,087,669 | 5/1978 | Sauer | 200/293 |
| 4,121,076 | 10/1978 | Taylor et al. | 200/307 |

FOREIGN PATENT DOCUMENTS 2825686  5/1979  Fed. Rep. of Germany ........... 200/307

Primary Examiner—Willis Little
Attorney, Agent, or Firm—L. P. Johns

[57] ABSTRACT

A detachable switch structure comprising an actuator, a contact block mounted on the actuator, and an adapter for mounting the contact block on the actuator; the block comprising a dielectric housing and enclosing separable contacts; the block being mounted on the actuator; the actuator comprising detachable interfitting means cooperative with corresponding means on the contact block housing which interfitting means includes elongated hook members on the adapter engageable with projections on the housing, the hook members including windows engageable with the projections, and the hook members including openings for insertion of a tool between the hook members and the projections for disengaging the same.

3 Claims, 2 Drawing Figures

DETACHABLE SWITCH STRUCTURE

CROSS-REFERENCE TO RELATED APPLICATIONS

This application is related to the copending applications of R. J. Johnston, Ser. No. 858,325, dated Dec. 17, 1977; W. J. Kellogg, Ser. No. 858,326, filed Dec. 7, 1977; R. J. Johnston, Ser. No. 858,323, filed Dec. 7, 1977; R. J. Johnston, S. G. Layciak and D. Colista, Ser. No. 045,450, filed June 4, 1979, and R. J. Johnston, S. G. Layciak and G. M. Cametti, Ser. No. 045,449, filed June 4, 1979.

BACKGROUND OF THE INVENTION

1. Field of the Invention

This invention relates to an insulating barrier for manual pilot devices and, more particularly, it pertains to a molded resinous insulator.

2. Description of the Prior Art

Electric switches for use in industrial applications usually include an actuating unit and one or more contact blocks or switches mounted thereon. The actuating units extend through an aperture in a control panel with the contact blocks mounted on the actuator behind the panel. Prior mounting means between the contact blocks and the actuator comprised an adapter between the contact switches and the unit to facilitate attachment and separation of the switches and unit. The adapter is preferably composed of a molded synthetic resin. A disadvantage of the adapters of prior construction has been their relatively high cost coupled with the use of metal mounting hardware.

SUMMARY OF THE INVENTION

In accordance with this invention it has been found that the foregoing disadvantage may be overcome by providing a detachable switch structure comprising of a manual actuating unit, a contact block detachably mounted on the unit, and an adapter for mounting the contact block on the unit; the block having a dielectric housing forming a contact compartment in which separable contacts and contact operating means are mounted; the contact operating means including a guided reciprocable plunger operatively connected to the unit, the block being detachably mounted on one side of the actuator; the unit comprising a tubular casing having one end abutting the other side of the adapter, the adapter and casing having detachable interfitting means comprising elongated hook members on the block detachably engaged with a projection on the adapter, there being at least two hook members equally spaced around the periphery of the adapter, the projection having a beveled edge in line with the hook path movement when the block is moved into interfitting position with the adapter, the hook comprising outturned, longitudinal, and inturned portions, the inturned portion being at the end of the longitudinal portion remote from the outturned portion, the inturned portion including a locking surface engaged with the projection, and the outturned portion comprising aperture means for insertion of detaching tool means for flexing the hook members out of engagement with the locking surface.

The advantage of the structure of this invention is that it provides for release slots to allow easy separation of the adapter from the unit and with or without the use of additional metal hardware and without removing switching units from the adapter.

DESCRIPTION OF THE PREFERRED EMBODIMENT

Figure 1:
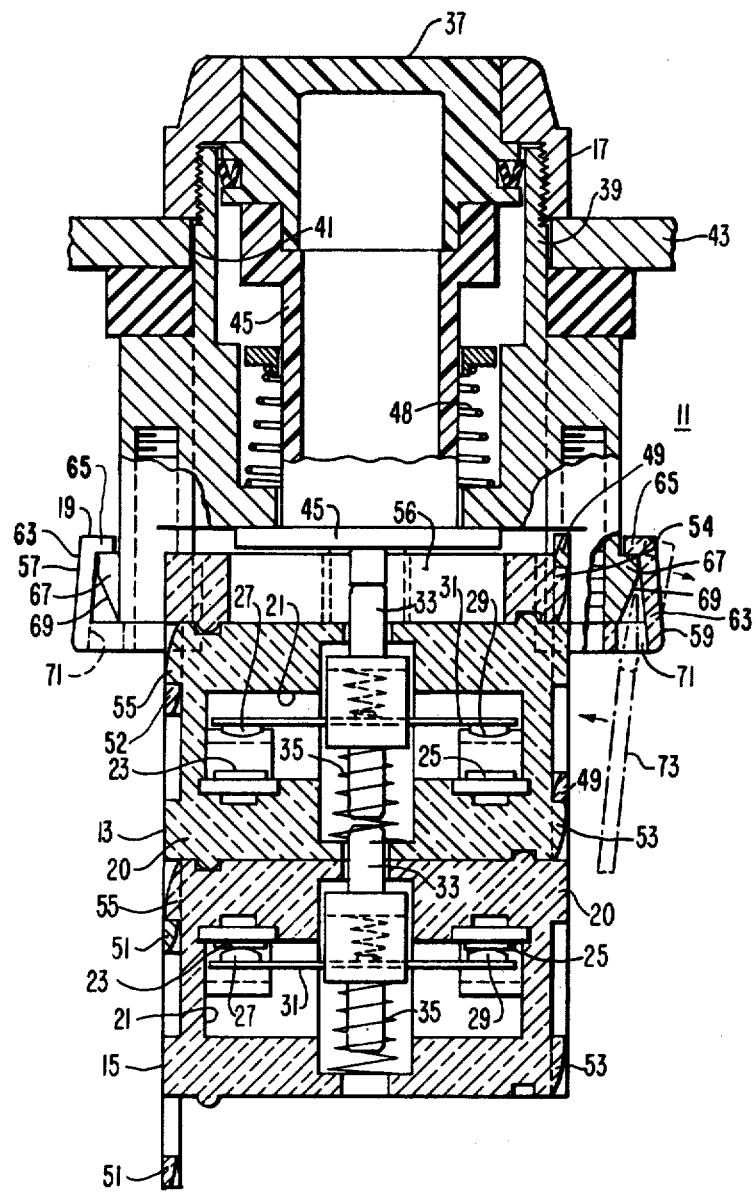
FIG. 1 is a vertical sectional view showing a pair of contact blocks assembled in tandem and attached to a contact block operator.

In FIG. 1, a detachable switch structure is generally indicated at 11 and it comprises a pair of contact blocks or switches 13, 15, and control operating unit 17, and an adapter 19. The contact blocks 13, 15 are similar to those shown in U.S. Pat. No. 4,121,076, which is incorporated herein by reference. Because of the full disclosure in that patent, the description of the operating mechanism is limited herein to the basic structure and operation.

Each contact block or switch 13, 15 comprises an electrically insulating housing 20 which forms a compartment 21 in which pairs of stationary contacts 23, 25 are mounted. Corresponding movable contacts 27, 29 are mounted on a rigid bridging contact carrier 31. The contact carrier 31 is mounted on a plunger 33 and a coil spring 35 maintains each plunger in the uppermost position so that the contacts in the contact block 13 are in the normally open position and the contacts in the contact block 15 are in the normally closed position.

The operating unit 17 comprises a push button 37 mounted within a casing 39 which extends through a hole 41 in a panel wall 43. The push button 37 is mounted on the upper end of tubular actuator 45 and is attached at the lower end of the actuator. A coil spring 48 retains the push button, the actuator, and the cam in the position shown. When the push button 37 is depressed the plunger 33, in contact with the actuator 45 is likewise depressed, whereby the several contacts 23-29 in the switch 13 are closed and the contacts 23-29 in the switch 15 are opened.

Each switch 13, 15 includes similar interlocking or latching hooks 49, 51 which engage cooperating projections 53, 55 on corresponding surfaces of adjacent control blocks.

In accordance with this invention the adapter 19 is disposed between the unit 17 and the switch 13 to facilitate latching and delatching of the switches onto the unit. As shown more particularly in FIG. 2 the adapter 19 comprises a hook 52 and a projection 54 which cooperate with corresponding projection 55 (FIG. 1) and hook 49 on the uppermost switch 13 for attaching the assembly of the switches 13, 15 onto the lower surface of the adapter 13. The adapter 19 also comprises an opening 56 through which the plunger 33 extends.

The adapter 19 likewise comprises latching means for detachably mounting the control block assembly onto the unit 17. The latching means comprises a plurality, and preferably two spaced hook members 57, 59 which are equally spaced on the periphery of the adapter. The adapter 19 is a molded member comprised of an electrically insulating material, such as synthetic resin, with the hooks 52, projection 52, and hook members 57, 59 being integral with the body of the adapter.

Figure 2:
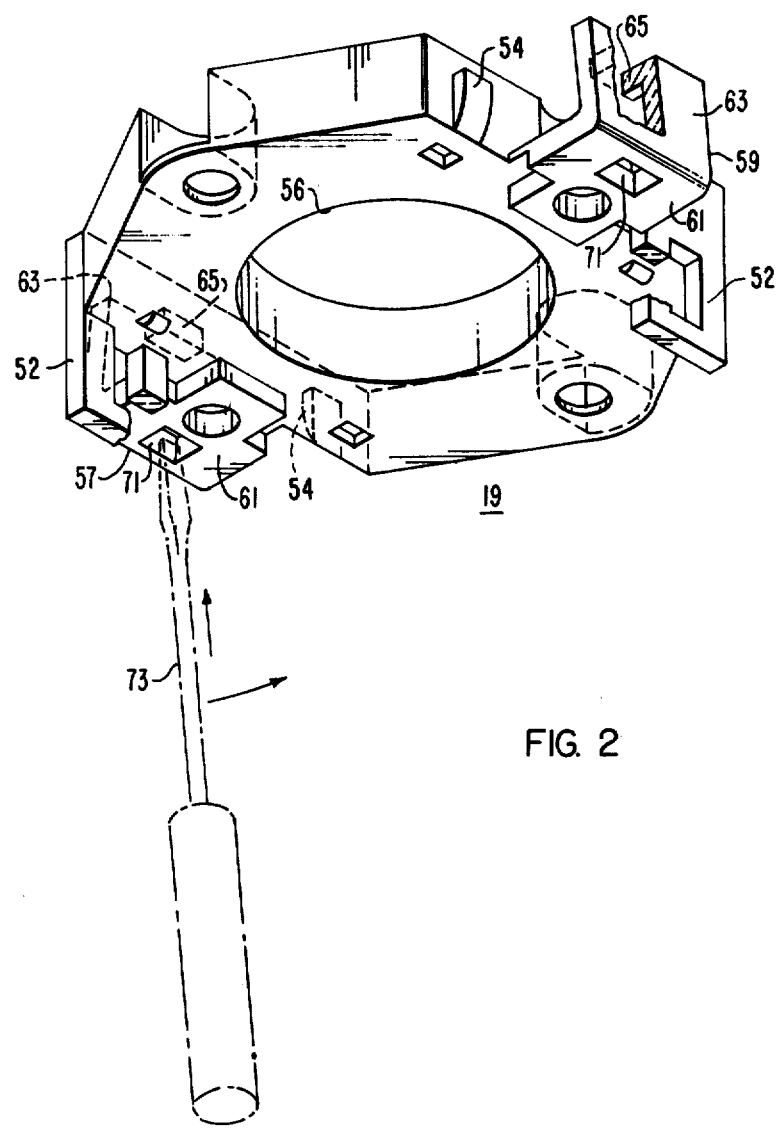
FIG. 2 is an isometric view of the adapter in accordance with this invention.

As shown in FIGS. 1 and 2 each hook member 57, 59 comprises an outwardly extending portion 61, a longitudinal portion 63, and an inturned portion 65. The inturned portion 65 of each hook 57, 59 latches onto a projection 67 (FIG. 1) extending from the outer surface of the unit 17. Each projection 67 includes an outwardly inclined or beveled surface 69 to facilitate attachment of the hook members 57, 59 when the assembled switches 13, 15 are moved longitudinally toward the unit 17 to effect latching, whereby the inturned portions 65 slide upwardly and outwardly over the beveled surface 69 and snap into the latched position, as shown by the solid line position of the hook members 57, 59. Inasmuch as the adapter 19 is comprised of a resinous material, the longitudinal portion 63 of each hook member 57, 59 deflect outwardly to the broken line position (FIG. 1) to enable latching and unlatching of the hook members on their corresponding projections 67.

The hook members 57, 59 comprise an aperture 71 extending through the outturned portion 61 which apertures enable the insertion of a tool, such as a screwdriver 73 (FIG. 2). Upon complete insertion of the blade of a screwdriver 73 into the aperture 71 the blade is moved between the beveled surface 69 and the inner surface of the longitudinal portion 63 (FIG. 1) to force the inturned portion 65 of the hook member into the broken line position and out of contact with the projection 67. Thus, the hook members 57, 59 are disengaged from their corresponding projections 67.

In conclusion, the detachable switch structure of this invention provides for improved hook members or snap hooks for detachably mounting contact blocks into place on a contact operator.

What is claimed is:

1. A detachable switch structure comprising an actuating unit, at least one switch detachably mounted on the unit, and an adapter for mounting the switch on the unit; the switch having a dielectric housing including opposite end, edge, and side walls forming a contact compartment, the switch having stationary and movable contacts, the switch also having movable contact operating means including a guided reciprocable plunger, the opposite end walls of the switch having plunger-receiving openings, the switch being detachably mounted on one side of the adapter; the unit comprising a tubular actuator having one end against the other side of the adapter, the unit having manual handle means extending from the other end of the casing to said one end; the adapter and actuating unit having releasable interfitting means comprising flexible hook members on the adapter releasably engaged with projections on the unit, there being at least two hook members equally spaced around the periphery of the adapter, the hook members being the only moving parts of the interfitting means and being integral with the adapter; the projection having a beveled edge in line with the hook path of movement when the adapter is moved into interfitting position with the unit, the hook comprising an outturned portion extending from the adapter and a longitudinal portion extending from the outturned portion and spaced from the adapter and an inturned portion at the end of the longitudinal portion remote from the outturned portion, the inturned portion including a locking surface engaging the projection, and the outturned portion comprising aperture means for insertion of releasing tool means between the beveled edge and the longitudinal portion for flexing the hook members out of engagement with the locking surface.

2. The structure of claim 1 in which there are two diametrically opposite hook members.

3. The structure of claim 2 in which the beveled edge is inclined outwardly toward the longitudinal portion to thereby provide a tapered space into which said tool means is inserted.